(12) United States Patent
Gardner et al.

(10) Patent No.: US 9,067,384 B2
(45) Date of Patent: Jun. 30, 2015

(54) MICROPOROUS MATERIAL HAVING DEGRADATION PROPERTIES AND ARTICLES PREPARED THEREFROM

(75) Inventors: Christine Gardner, Irwin, PA (US); James L. Boyer, Monroeville, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 285 days.

(21) Appl. No.: 12/794,871

(22) Filed: Jun. 7, 2010

(65) Prior Publication Data

US 2010/0316854 A1 Dec. 16, 2010

Related U.S. Application Data

(60) Provisional application No. 61/185,653, filed on Jun. 10, 2009.

(51) Int. Cl.

| | | |
|---|---|---|
| B32B 3/10 | (2006.01) | |
| B32B 3/26 | (2006.01) | |
| B29C 67/20 | (2006.01) | |
| B32B 9/02 | (2006.01) | |
| B32B 27/08 | (2006.01) | |
| B32B 27/20 | (2006.01) | |
| C08J 9/00 | (2006.01) | |
| C08L 23/02 | (2006.01) | |
| C08L 23/04 | (2006.01) | |
| C08L 23/06 | (2006.01) | |
| C08L 23/10 | (2006.01) | |
| C08L 23/18 | (2006.01) | |
| C08K 3/00 | (2006.01) | |
| C08K 5/00 | (2006.01) | |
| C08K 5/098 | (2006.01) | |
| C08L 1/00 | (2006.01) | |
| C08L 3/00 | (2006.01) | |
| C08L 51/06 | (2006.01) | |
| C08L 67/04 | (2006.01) | |

(52) U.S. Cl.
CPC .......... *B32B 3/26* (2013.01); *Y10T 428/24893* (2015.01); *Y10T 428/249978* (2015.04); *B29C 67/202* (2013.01); *B32B 9/02* (2013.01); *B32B 27/08* (2013.01); *B32B 27/20* (2013.01); *C08J 9/0014* (2013.01); *C08J 9/0052* (2013.01); *C08J 9/0066* (2013.01); *C08J 2205/05* (2013.01); *C08J 2300/16* (2013.01); *C08K 3/0033* (2013.01); *C08K 5/0016* (2013.01); *C08K 5/098* (2013.01); *C08L 1/00* (2013.01); *C08L 3/00* (2013.01); *C08L 23/02* (2013.01); *C08L 23/04* (2013.01); *C08L 23/06* (2013.01); *C08L 23/10* (2013.01); *C08L 23/18* (2013.01); *C08L 51/06* (2013.01); *C08L 67/04* (2013.01); *C08L 2205/02* (2013.01); *C08L 2205/03* (2013.01); *C08L 2207/068* (2013.01)

(58) Field of Classification Search
CPC ........ B29C 67/202; B32B 27/00; B32B 3/26; B32B 9/02; B32B 27/08; B32B 27/20; C08J 9/0014; C08J 9/0052; C08J 9/0066; C08J 2205/05; C08J 2300/16; C08K 3/003322; C08K 3/36; C08K 5/0016; C08K 5/0098; C08L 3/00; C08L 11/00; C08L 23/02; C08L 23/04; C08L 23/06; C08L 23/10; C08L 23/18; C08L 51/06; C08L 67/04; C08L 91/00; C08L 91/06; C08L 2205/02; C08L 2205/03; C08L 2207/062; C08L 2207/068; C08L 2666/02

See application file for complete search history.

(56) References Cited

U.S. PATENT DOCUMENTS

| | | |
|---|---|---|
| 2,940,830 A | 6/1960 | Thornhill |
| 4,681,750 A | 7/1987 | Johnson et al. |
| 5,196,262 A | 3/1993 | Schwarz et al. |
| 5,206,087 A * | 4/1993 | Tokiwa et al. ............... 428/403 |
| 5,853,809 A | 12/1998 | Campbell et al. |
| 7,461,791 B2 * | 12/2008 | Keshura ....................... 235/488 |
| 2004/0062884 A1 * | 4/2004 | Hao ............................. 428/34.1 |
| 2004/0094949 A1 * | 5/2004 | Savagian et al. ............. 283/81 |
| 2004/0209063 A1 * | 10/2004 | Gallagher et al. ......... 428/304.4 |
| 2006/0292317 A1 * | 12/2006 | Parrinello et al. ......... 428/32.22 |
| 2007/0190303 A1 * | 8/2007 | Lee et al. ................... 428/304.4 |

(Continued)

FOREIGN PATENT DOCUMENTS

| | | |
|---|---|---|
| CN | 101722699 | 6/2010 |
| DE | 35 45 615 C3 | 5/1989 |

(Continued)

OTHER PUBLICATIONS http://www.hc-sc.gc.ca/ewh-semt/pubs/contaminants/psl1-lsp1/phthalate_dibutyl_phtalate/phthalate_dibutyl_phtalate_2-eng.php.*
Anonymous, "Why Choose Bio-Tec Environmental?", Online URL: http://web.archive.org/web/20080714051422/www.bio-tec.biz/whyus.html, Jul. 14, 2008, entire document, internet publication.
Anonymous, "All About Bio-Batch", Online URL: http://web.archive.org/web/20080822042951/www.bio-tec.biz/products.html, Aug. 22, 2008, entire document, internet publication.

*Primary Examiner* — Gerard Higgins
*Assistant Examiner* — Sathavaram I Reddy
(74) *Attorney, Agent, or Firm* — The Webb Law Firm

(57) ABSTRACT

The present invention is directed to biodegradable microporous materials and multi-layer articles containing them. The biodegradable microporous materials comprise:
(a) a polyolefin matrix,
(b) finely divided, particulate filler distributed throughout the matrix,
(c) at least 35 percent by volume of a network of interconnecting pores communicating throughout the microporous material, and
(d) a biodegradation promoting material distributed throughout the matrix.

Also provided are multilayer articles prepared from the above-described microporous materials.

26 Claims, No Drawings

(56) References Cited

U.S. PATENT DOCUMENTS

2008/0103232 A1 5/2008 Lake et al.
2010/0055273 A1* 3/2010 Chen .............................. 426/392

FOREIGN PATENT DOCUMENTS

| | | |
|---|---|---|
| JP | 03100028 | 4/1991 |
| JP | 4136043 | 5/1992 |
| JP | 04202442 | 7/1992 |
| JP | 1993186623 | 7/1993 |
| JP | 09291165 | 11/1997 |
| JP | 2003128835 | 5/2003 |
| WO | WO 98/17714 * 4/1998 ................ C08J 5/18 |

* cited by examiner

MICROPOROUS MATERIAL HAVING DEGRADATION PROPERTIES AND ARTICLES PREPARED THEREFROM

CROSS REFERENCE TO RELATED APPLICATIONS

This application claims the benefit of U.S. Provisional Patent Application No. 61/185,653, filed on Jun. 10, 2009.

FIELD OF THE INVENTION

The present invention relates to microporous materials demonstrating degradation properties, such as biodegradation, and multilayer articles prepared therefrom.

BACKGROUND OF THE INVENTION

In recent years synthetic substrates have been developed for use in the printing and labeling industries. Synthetic substrates offer significant advantages over natural wood pulp paper including, for example, improved print quality, water resistance, tear resistance, and tensile strength. Such materials typically are comprised of polymeric materials such as polyolefins or polyesters.

Unfortunately, such synthetic materials are not readily degradable in natural environments, and so in recent years, environmental littering and damage due to discarded plastics has occurred. Accordingly, development of plastics that can be degraded in natural environments and landfills has been desired.

SUMMARY OF THE INVENTION

The present invention is directed to biodegradable microporous materials comprising:
 (a) a polyolefin matrix,
 (b) finely divided, particulate filler distributed throughout the matrix,
 (c) at least 35 percent by volume of a network of interconnecting pores communicating throughout the microporous material, and
 (d) a biodegradation promoting material distributed throughout the matrix.

The present invention additionally provides multilayer articles prepared from the above-described microporous materials. The multilayer articles comprise at least one layer of a microporous material and at least one layer of a material that may be the same as or different from the microporous material.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent.

The various embodiments and examples of the present invention as presented herein are each understood to be non-limiting with respect to the scope of the invention.

As used in the following description and claims, the following terms have the meanings indicated below:

By "polymer" is meant a polymer including homopolymers and copolymers, and oligomers. By "composite material" is meant a combination of two or more differing materials.

As used herein, "formed from" denotes open, e.g., "comprising," claim language. As such, it is intended that a composition "formed from" a list of recited components be a composition comprising at least these recited components, and can further comprise other, nonrecited components, during the composition's formation.

As used herein, the term "polymeric inorganic material" means a polymeric material having a backbone repeat unit based on an element or elements other than carbon. For more information see James Mark et al., inorganic Polymers, Prentice Hall Polymer Science and Engineering Series, (1992) at page 5, which is specifically incorporated by reference herein. Moreover, as used herein, the term "polymeric organic materials" means synthetic polymeric materials, semisynthetic polymeric materials and natural polymeric materials, all of which have a backbone repeat unit based on carbon.

An "organic material," as used herein, means carbon containing compounds wherein the carbon is typically bonded to itself and to hydrogen, and often to other elements as well, and excludes binary compounds such as the carbon oxides, the carbides, carbon disulfide, etc.; such ternary compounds as the metallic cyanides, metallic carbonyls, phosgene, carbonyl sulfide, etc.; and carbon-containing ionic compounds such as metallic carbonates, for example calcium carbonate and sodium carbonate. See R. Lewis, Sr., Hawley's Condensed Chemical Dictionary, (12th Ed. 1993) at pages 761-762, and M. Silberberg, Chemistry The Molecular Nature of Matter and Change (1996) at page 586, which are specifically incorporated by reference herein.

As used herein, the term "inorganic material" means any material that is not an organic material.

As used herein, a "thermoplastic" material is a material that softens when exposed to heat and returns to its original condition when cooled to room temperature. As used herein, a "thermoset" material is a material that solidifies or "sets" irreversibly when heated.

The term 'biodegradable' has been defined by the industry and as used herein is defined as: " . . . capable of undergoing decomposition into $CO_2$, methane, water, inorganic compounds or biomass in which the predominant mechanism is the enzymatic action of micro-organisms, that can be measured by standardized tests, in a specified period of time, reflecting available disposal conditions."

The term 'compostable' material has been defined by the industry and as used herein is defined as: " . . . capable of undergoing biological decomposition in a compost site as part of an available program, such that the material (that is, feedstock) is not visually distinguishable and breaks down to $CO_2$, water, inorganic compounds, and biomass, at a rate consistent with known compostable materials." Typical composting conditions: time: 12 weeks; temperature: >140° F. (>50° C.). A compostable plastic is one that will biodegrade completely in a composting situation, I.e., when combined with other plant material in an aerobic atmosphere. Compostable plastics can be put into industrial composting facilities and will biodegrade completely. Not all compostable plastics will biodegrade completely in a home compost bin.

By "degradation" is meant that a substance will break down. It does not mean that a substance will break down naturally in the soil, or that it will necessarily break down completely to $CO_2$ and water. The products of a degradable substance may not necessarily be usable by living organisms as food or energy.

"Renewable" polymers and plastics are manufactured from renewable resources; i.e., theoretically, the raw materials used to manufacture the polymers and plastics will not run out. ASTM D6866 "Standard Test Methods for Determining the Biobased Content of Natural Range Materials Using Radiocarbon and Isotope Ratio Mass Spectrometry Analysis" is a test method which determines the percentage of a product that comes from renewable resources.

Biomass is renewable; more plants can be grown to replace those that are used. Chemicals, including monomers for polymer production, may be derived from biomass. Polymers made from these monomers are, therefore, renewable polymers; they can be replaced by growing more biomass and then repeating the manufacturing process. Examples of commonly used renewable polymers include starch and polylactic acid.

The term "biobased" material as used herein refers to an organic material in which the carbon is derived from a renewable resource via biological processes. Biobased materials include all plant and animal mass derived from $CO_2$ recently fixed via photosynthesis, per definition of a renewable resource. Biobased materials may or may not be biodegradable or compostabie.

As used herein, "microporous material" or "microporous sheet material" means a material having a network of interconnecting pores, wherein, on a coating-free, printing ink-free, impregnant-free, and pre-bonding basis, the pores have a volume average diameter ranging from 0.001 to 0.5 micrometer, and constitute at least 5 percent by volume of the material as discussed herein below.

By "plastomer" is meant a polymer exhibiting both plastic and elastomeric properties.

As noted above, the present invention is directed to biodegradable microporous material comprising:
(a) a polyolefin matrix,
(b) finely divided, particulate filler distributed throughout the matrix,
(c) at least 35 percent by volume of a network of interconnecting pores communicating throughout the microporous material, and
(d) a biodegradation promoting material distributed throughout the matrix.
In certain embodiments, the biodegradable microporous material also is compostable.

Biodegradable microporous materials of the present invention comprise a polyolefin matrix (a). Polyolefins are polymers derived from at least one ethylenically unsaturated monomer. In certain embodiments of the present invention, the matrix comprises a plastomer. For example, the matrix may comprise a plastomer derived from butene, hexene, and/or octene. Suitable plastomers are available from ExxonMobil Chemical under the tradename "EXACT".

In certain embodiments of the present invention, the matrix comprises a different polymer derived from at least one ethylenically unsaturated monomer, which may be used in combination with the plastomer. Examples include polymers derived from ethylene, propylene, and/or butene, such as polyethylene, polypropylene, and polybutene. High density and/or ultrahigh molecular weight polyolefins are also suitable.

In a particular embodiment of the present invention, the polyolefin matrix comprises a copolymer of ethylene and butene.

Non-limiting examples of ultrahigh molecular weight (UHMW) polyolefin can include essentially linear UHMW polyethylene or polypropylene. Inasmuch as UHMW polyolefins are not thermoset polymers having an infinite molecular weight, they are technically classified as thermoplastic materials.

The ultrahigh molecular weight polypropylene can comprise essentially linear ultrahigh molecular weight isotactic polypropylene. Often the degree of isotacticity of such polymer is at least 95 percent, e.g., at least 98 percent.

While there is no particular restriction on the upper limit of the intrinsic viscosity of the UHMW polyethylene, in one non-limiting example, the intrinsic viscosity can range from 18 to 39 deciliters/gram, e.g., from 18 to 32 deciliters/gram. While there is no particular restriction on the upper limit of the intrinsic viscosity of the UHMW polypropylene, in one non-limiting example, the intrinsic viscosity can range from 6 to 18 deciliters/gram, e.g., from 7 to 16 deciliters/gram.

For purposes of the present invention, intrinsic viscosity is determined by extrapolating to zero concentration the reduced viscosities or the inherent viscosities of several dilute solutions of the UHMW polyolefin where the solvent is freshly distilled decahydronaphthalene to which 0.2 percent by weight, 3,5-di-tert-butyl-4-hydroxyhydrocinnamic acid, neopentanetetrayl ester [CAS Registry No. 6683-19-8] has been added. The reduced viscosities or the inherent viscosities of the UHMW polyolefin are ascertained from relative viscosities obtained at 135° C. using an Ubbelohde No. 1 viscometer in accordance with the general procedures of ASTM D 4020-81, except that several dilute solutions of differing concentration are employed.

The nominal molecular weight of UHMW polyethylene is empirically related to the intrinsic viscosity of the polymer in accordance with the following equation:

$$M = 5.37 \times 10^4 [\acute{\eta}]^{1.37}$$

wherein M is the nominal molecular weight and $[\acute{\eta}]$ is the intrinsic viscosity of the UHMW polyethylene expressed in deciliters/gram. Similarly, the nominal molecular weight of UHMW polypropylene is empirically related to the intrinsic viscosity of the polymer according to the following equation:

$$M = 8.88 \times 10^4 [\acute{\eta}]^{1.25}$$

wherein M is the nominal molecular weight and $[\acute{\eta}]$ is the intrinsic viscosity of the UHMW polypropylene expressed in deciliters/gram.

A mixture of substantially linear ultrahigh molecular weight polyethylene and lower molecular weight polyethylene can be used. In a non-limiting embodiment, the UHMW polyethylene has an intrinsic viscosity of at least 10 deciliters/gram, and the lower molecular weight polyethylene has an ASTM D 1238-86 Condition E melt index of less than 50 grams/10 minutes, e.g., less than 25 grams/10 minutes, such as less than 15 grams/10 minutes, and an ASTM D 1238-86 Condition F melt index of at least 0.1 gram/10 minutes, e.g., at least 0.5 gram/10 minutes, such as at least 1.0 gram/10 minutes. The amount of UHMW polyethylene used (as weight percent) in this embodiment is described in column 1, line 52 to column 2, line 18 of U.S. Pat. No. 5,196,262, which disclosure is incorporated herein by reference. More particularly, the weight percent of UHMW polyethylene used is described in relation to FIG. 6 of U.S. Pat. No. 5,196,262; namely, with reference to the polygons ABCDEF, GHCI or JHCK of FIG. 6, which Figure is incorporated herein by reference.

The nominal molecular weight of the lower molecular weight polyethylene (LMWPE) is lower than that of the UHMW polyethylene. LMWPE is a thermoplastic material and many different types are known. One method of classification is by density, expressed in grams/cubic centimeter and rounded to the nearest thousandth, in accordance with ASTM D 1248-84 (Reapproved 1989). Non-limiting examples of the densities of LMWPE are found in the following Table 1.

TABLE 1

| Type | Abbreviation | Density, g/cm$^3$ |
|---|---|---|
| Low Density Polyethylene | LDPE | 0.910-0.925 |
| Medium Density Polyethylene | MDPE | 0.926-0.940 |
| High Density Polyethylene | HDPE | 0.941-0.965 |

Any or all of the polyethylenes listed in Table 1 above may be used as the LMWPE in the matrix of the microporous material. HDPE may be used because it can be more linear than MDPE or LDPE. Processes for making the various LMWPE's are well known and well documented. They include the high pressure process, the Phillips Petroleum Company process, the Standard Oil Company (Indiana) process, and the Ziegler process. The ASTM D 1238-86 Condition E (that is, 190° C. and 2.16 kilogram load) melt index of the LMWPE is less than about 50 grams/10 minutes. Often the Condition E melt index is less than about 25 grams/10 minutes. The Condition E melt index can be less than about 15 grams/10 minutes. The ASTM D 1238-86 Condition F (that is, 190° C. and 21.6 kilogram load) melt index of the LMWPE is at least 0.1 gram/10 minutes. In many cases the Condition F melt index is at least 0.5 gram/10 minutes such as at least 1.0 gram/10 minutes.

The UHMWPE and the LMWPE may together constitute at least 65 percent by weight, e.g., at least 85 percent by weight, of the polyolefin polymer of the microporous material. Also, the UHMWPE and LMWPE together may constitute substantially 100 percent by weight of the polyolefin polymer of the microporous material.

In a particular embodiment of the present invention, the microporous material can comprise a polyolefin comprising ultrahigh molecular weight polyethylene, ultrahigh molecular weight polypropylene, high density polyethylene, high density polypropylene, or mixtures thereof.

If desired, other thermoplastic organic polymers also may be present in the matrix of the microporous material provided that their presence does not materially affect the properties of the microporous material substrate in an adverse manner. The amount of the other thermoplastic polymer which may be present depends upon the nature of such polymer. In general, a greater amount of other thermoplastic organic polymer may be used if the molecular structure contains little branching, few long side chains, and few bulky side groups, than when there is a large amount of branching, many long side chains, or many bulky side groups. Non-limiting examples of thermoplastic organic polymers that optionally may be present in the matrix of the microporous material include low density polyethylene, high density polyethylene, poly(tetrafluoroethylene), polypropylene, copolymers of ethylene and propylene, copolymers of ethylene and acrylic acid, and copolymers of ethylene and methacrylic acid. If desired, all or a portion of the carboxyl groups of carboxyl-containing copolymers can be neutralized with sodium, zinc or the like. Generally, the microporous material comprises at least 70 percent by weight of UHMW polyolefin, based on the weight of the matrix. In a non-limiting embodiment, the above-described other thermoplastic organic polymer are substantially absent from the matrix of the microporous material.

The biodegradable, microporous materials of the present invention further comprise finely divided, particulate filler (b) distributed throughout the matrix. The particulate filler can be a substantially water-insoluble filler material.

The particulate filler comprises particles that can be formed from materials selected from polymeric and nonpolymeric inorganic materials, polymeric and nonpolymeric organic materials, composite materials, and mixtures of any of the foregoing. The surface of the particle can be modified in any manner well known in the art, including, but not limited to, chemically or physically changing its surface characteristics using techniques known in the art.

For example a particle can be formed from a primary material that is coated, clad or encapsulated with one or more secondary materials to form a composite particle that has a softer surface. In yet another alternative embodiment, particles formed from composite materials can be formed from a primary material that is coated, clad or encapsulated with a different form of the primary material. For more information on particles useful in the present invention, see G. Wypych, Handbook of Fillers, 2nd Ed. (1999) at pages 15-202, which are specifically incorporated by reference herein.

The particles suitable for use in the microporous materials of the invention can comprise inorganic elements or compounds known in the art. Suitable particles can be formed from ceramic materials, metallic materials, and mixtures of any of the foregoing. Suitable ceramic materials comprise metal oxides, metal nitrides, metal carbides, metal sulfides, metal silicates, metal borides, metal carbonates, and mixtures of any of the foregoing. Specific, nonlimiting examples of metal nitrides are, for example boron nitride; specific, nonlimiting examples of metal oxides are, for example zinc oxide; nonlimiting examples of suitable metal sulfides are, for example molybdenum disulfide, tantalum disulfide, tungsten disulfide, and zinc sulfide; nonlimiting suitable examples of metal silicates are, for example aluminum silicates and magnesium silicates such as vermiculite.

The particles can comprise, for example a core of essentially a single inorganic oxide such as silica in colloidal, fumed, or amorphous form, alumina or colloidal alumina, titanium dioxide, cesium oxide, yttrium oxide, colloidal yttria, zirconia, e.g., colloidal or amorphous zirconia, and mixtures of any of the foregoing; or an inorganic oxide of one type upon which is deposited an organic oxide of another type.

Nonpolymeric, inorganic materials useful in forming the particles used in the present invention comprise inorganic materials selected from graphite, metals, oxides, carbides, nitrides, borides, sulfides, silicates, carbonates, sulfates, and hydroxides. A nonlimiting example of a useful inorganic oxide is zinc oxide. Nonlimiting examples of suitable inorganic sulfides include molybdenum disulfide, tantalum disulfide, tungsten disulfide, and zinc sulfide. Nonlimiting examples of useful inorganic silicates include aluminum silicates and magnesium silicates, such as vermiculite. Nonlimiting examples of suitable metals include molybdenum, platinum, palladium, nickel, aluminum, copper, gold, iron, silver, alloys, and mixtures of any of the foregoing.

In certain embodiments, the particles are selected from fumed silica, amorphous silica, colloidal silica, alumina, colloidal alumina, titanium dioxide, cesium oxide, yttrium oxide, colloidal yttria, zirconia, colloidal zirconia, and mixtures of any of the foregoing.

Other useful particles include surface-modified silicas such as are described in U.S. Pat. No. 5,853,809 at column 6, line 51 to column 8, line 43, which is incorporated herein by reference.

As another alternative, a particle can be formed from a primary material that is coated, clad or encapsulated with one or more secondary materials to form a composite material that has a harder surface. Also, a particle can be formed from a primary material that is coated, clad or encapsulated with a differing form of the primary material to form a composite material that has a harder surface.

In one example, an inorganic particle formed from an inorganic material such as silicon carbide or aluminum nitride can be provided with a silica, carbonate or nanoclay coating to form a useful composite particle. In another example, a silane coupling agent with alkyl side chains can interact with the surface of an inorganic particle formed from an inorganic oxide to provide a useful composite particle having a "softer" surface. Other examples include cladding, encapsulating or coating particles formed from nonpolymeric or polymeric materials with differing nonpolymeric or polymeric materials. A specific nonlimiting example of such composite particles is DUALITE™, which is a synthetic polymeric particle coated with calcium carbonate that is commercially available from Pierce and Stevens Corporation of Buffalo, N.Y.

In certain embodiments of the invention, the particles are formed from solid lubricant materials. As used herein, the term "solid lubricant" means any solid used between two surfaces to provide protection from damage during relative movement and/or to reduce friction and wear. In one embodiment, the solid lubricants are inorganic solid lubricants. As used herein, "inorganic solid lubricant" means that the solid lubricants have a characteristic crystalline habit which causes them to shear into thin, flat plates which readily slide over one another and thus produce an antifriction lubricating effect. See R. Lewis, Sr., Hawley's Condensed Chemical Dictionary, (12th Ed. 1993) at page 712, which is specifically incorporated by reference herein. Friction is the resistance to sliding one solid over another. F. Clauss, Solid Lubricants and Self-Lubricating Solids (1972) at page 1, which is specifically incorporated by reference herein.

The particles may have a lamellar structure. Particles having a lamellar structure are composed of sheets or plates of atoms in hexagonal array, with strong bonding within the sheet and weak van der Waals bonding between sheets, providing low shear strength between sheets. A nonlimiting example of a lamellar structure is a hexagonal crystal structure. Inorganic solid particles having a lamellar fullerene (i.e., buckyball) structure also are useful in the present invention.

Nonlimiting examples of suitable materials having a lamellar structure that are useful in forming the particles used in the present invention include boron nitride, graphite, metal dichalcogenides, mica, talc, gypsum, kaolinite, calcite, cadmium iodide, silver sulfide, and mixtures of any of the foregoing. Suitable metal dichalcogenides include molybdenum disulfide, molybdenum diselenide, tantalum disulfide, tantalum diselenide, tungsten disulfide, tungsten diselenide, and mixtures of any of the foregoing.

The particles can be formed from nonpolymeric, organic materials. Nonlimiting examples of nonpolymeric, organic materials useful in the present invention include, but are not limited to, stearates (such as zinc stearate and aluminum stearate), diamond, carbon black, and stearamide.

The particles can be formed from inorganic polymeric materials. Nonlimiting examples of useful inorganic polymeric materials include polyphosphazenes, polysilanes, polysiloxane, polygeremanes, polymeric sulfur, polymeric selenium, silicones, and mixtures of any of the foregoing. A specific, nonlimiting example of a particle formed from an inorganic polymeric material suitable for use in the present invention is TOSPEARL[20], which is a particle formed from cross-linked siloxanes and is commercially available from Toshiba Silicones Company, Ltd. of Japan.

The particles can be formed from synthetic, organic polymeric materials. Nonlimiting examples of suitable organic polymeric materials include, but are not limited to, thermoset materials and thermoplastic materials. Nonlimiting examples of suitable thermoplastic materials include thermoplastic polyesters such as polyethylene terephthalate, polybutylene terephthalate, and polyethylene naphthalate, polycarbonates, polyolefins such as polyethylene, polypropylene, and polyisobutene, acrylic polymers such as copolymers of styrene and an acrylic acid monomer, and polymers containing methacrylate, polyamides, thermoplastic polyurethanes, vinyl polymers, and mixtures of any of the foregoing.

Nonlimiting examples of suitable thermoset materials include thermoset polyesters, vinyl esters, epoxy materials, phenolics, aminoplasts, thermoset polyurethanes, and mixtures of any of the foregoing. A specific, nonlimiting example of a synthetic polymeric particle formed from an epoxy material is an epoxy microgel particle. A thermoset material has formed a crosslinked network. As used herein, a polymeric material is "crosslinked" if it at least partially forms a polymeric network. One skilled in the art will understand that the presence and degree of crosslinking (crosslink density) can be determined by a variety of methods, such as dynamic mechanical thermal analysis (DMTA) using a TA Instruments DMA 2980 DMTA analyzer conducted under nitrogen. This method determines the glass transition temperature and crosslink density of free films of coatings or polymers. These physical properties of a cured material are related to the structure of the crosslinked network.

According to this method, the length, width, and thickness of a sample to be analyzed are first measured, the sample is tightly mounted to the Polymer Laboratories MK III apparatus, and the dimensional measurements are entered into the apparatus. A thermal scan is run at a heating rate of 3.degree. C./min, a frequency of 1 Hz, a strain of 120%, and a static force of 0.01N, with sample measurements occurring every two seconds. The mode of deformation, glass transition temperature and crosslink density of the sample can be determined according to this method. Higher crosslink density values indicate a higher degree of crosslinking in the coating.

The particles also can be hollow particles formed from materials selected from polymeric and nonpolymeric inorganic materials, polymeric and nonpolymeric organic materials, composite materials, and mixtures of any of the foregoing. Nonlimiting examples of suitable materials from which the hollow particles can be formed are described above. In one embodiment, the hollow particles are hollow glass spheres.

The filler can comprise a siliceous filler, talc, carbon black, charcoal, graphite, titanium oxide, iron oxide, copper oxide, zinc oxide, antimony oxide, zirconia, magnesia, alumina, molybdenum disulfide, zinc sulfide, barium sulfate, strontium sulfate, calcium carbonate, and/or magnesium carbonate. Non-limiting examples of siliceous fillers that may be used to prepare the microporous material include silica, mica, montmorillonite, kaolinite, nanoclays such as cloisite available from Southern Clay Products, talc, diatomaceous earth, vermiculite, natural and synthetic zeolites, calcium silicate, aluminum silicate, sodium aluminum silicate, aluminum polysilicate, alumina silica gels and glass particles.

The filler typically comprises a hydrophilic material. Hydrophilic fillers allow for greater moisture content distributed throughout the microporous material, which in turn aids degradation of the material.

In certain embodiments of the present invention, the filler comprises silica such as precipitated silica. Many different precipitated silicas may be employed in the present invention but the precipitated silicas obtained by precipitation from an aqueous solution of sodium silicate using a suitable acid such as sulfuric acid, hydrochloric acid, or carbon dioxide are used most often. Such precipitated silicas are themselves known and processes for producing them are described in detail in the U.S. Pat. No. 2,940,830 and in West German Offenlegungsschrift No. 35 45 615. When precipitated silica is used, it typically has an average ultimate particle size of less than about 0.1 micrometer.

The filler particles can constitute from 20 to 90 percent by weight of the microporous material. For example, such filler particles can constitute from 20 to 90 percent by weight of the microporous material, such as from 30 percent to 90 percent by weight of the microporous material, or from 40 to 90 percent by weight of the microporous material, or from 50 to 90 percent by weight of the microporous material and even from 60 percent to 90 percent by weight of the microporous material. The filler is typically present in the microporous material of the present invention in an amount of 50 percent to about 85 percent by weight of the microporous material.

The biodegradable microporous material of the present invention further comprises a network of interconnecting pores (c) communicating throughout the microporous material.

On an impregnant-free basis, such pores can comprise at least 15 percent by volume, e.g. from at least 20 to 95 percent by volume, or from at least 25 to 95 percent by volume, or from 35 to 70 percent by volume of the microporous material. Often the pores comprise at least 35 percent by volume, or even at least 45 percent by volume of the microporous material. Such high porosity provides higher surface area and allows distribution of moisture throughout the microporous material, which in turn facilitates degradation of the material.

As used herein and in the claims, the porosity (also known as void volume) of the microporous material, expressed as percent by volume, is determined according to the following equation:

$$Porosity=100[1-d_1/d_2]$$

wherein $d_1$ is the density of the sample, which is determined from the sample weight and the sample volume as ascertained from measurements of the sample dimensions, and $d_2$ is the density of the solid portion of the sample, which is determined from the sample weight and the volume of the solid portion of the sample. The volume of the solid portion of the same is determined using a Quantachrome stereopycnometer (Quantachrome Corp.) in accordance with the accompanying operating manual.

The volume average diameter of the pores of the microporous material can be determined by mercury porosimetry using an Autopore III porosimeter (Micromeretics, Inc.) in accordance with the accompanying operating manual. The volume average pore radius for a single scan is automatically determined by the porosimeter. In operating the porosimeter, a scan is made in the high pressure range (from 138 kilopascals absolute to 227 megapascals absolute). If approximately 2 percent or less of the total intruded volume occurs at the low end (from 138 to 250 kilopascals absolute) of the high pressure range, the volume average pore diameter is taken as twice the volume average pore radius determined by the porosimeter. Otherwise, an additional scan is made in the low pressure range (from 7 to 165 kilopascals absolute) and the volume average pore diameter is calculated according to the equation:

$$d=2[v_1r_1/w_1+v_2r_2/w_2]/[v_1/w_1+v_2/w_2]$$

wherein d is the volume average pore diameter, $v_1$ is the total volume of mercury intruded in the high pressure range, $v_2$ is the total volume of mercury intruded in the low pressure range, $r_1$ is the volume average pore radius determined from the high pressure scan, $r_2$ is the volume average pore radius determined from the low pressure scan, $w_1$ is the weight of the sample subjected to the high pressure scan, and $w_2$ is the weight of the sample subjected to the low pressure scan. The volume average diameter of the pores can be in the range of from 0.001 to 0.50 micrometers, e.g., from 0.005 to 0.30 micrometers, or from 0.01 to 0.25 micrometers.

In the course of determining the volume average pore diameter of the above procedure, the maximum pore radius detected is sometimes noted. This is taken from the low pressure range scan, if run; otherwise it is taken from the high pressure range scan. The maximum pore diameter is twice the maximum pore radius. Inasmuch as some production or treatment steps, e.g., coating processes, printing processes, impregnation processes and/or bonding processes, can result in the filling of at least some of the pores of the microporous material, and since some of these processes irreversibly compress the microporous material, the parameters in respect of porosity, volume average diameter of the pores, and maximum pore diameter are determined for the microporous material prior to the application of one or more of such production or treatment steps.

The biodegradable microporous material of the present invention further comprises a biodegradation promoting material (d) distributed throughout the matrix. Any biodegradation promoting material known in the art may be used. For example, materials that attract microorganisms in the environment and then enable the microorganisms to metabolize the molecular structure of polymers, such as those disclosed in United States Patent Application Publication No. 2008/0103232 A1, are suitable. Such materials are disclosed in paragraphs [0058 through 0071] of the cited published patent application, incorporated herein by reference.

Other suitable biodegradation promoting materials include catalytic transition metal compounds, metal stearates such as cobalt stearate and manganese stearate, and/or a metal chelate.

The biodegradation promoting material (d) is present in the microporous material of the present invention at least in an amount sufficient to render the material biodegradable.

To prepare the microporous materials of the present invention, filler, polymer powder, processing plasticizer, biodegradation promoting material and minor amounts of lubricant and antioxidant are mixed until a substantially uniform mixture is obtained. The weight ratio of filler to polymer powder employed in forming the mixture is essentially the same as that of the microporous material substrate to be produced. The mixture, together with additional processing plasticizer, is introduced to the heated barrel of a screw extruder. Attached to the extruder is a die, such as a sheeting die, to form the desired end shape.

In an exemplary manufacturing process, when the material is formed into a sheet or film, a continuous sheet or film formed by a die is forwarded to a pair of heated calender rolls acting cooperatively to form continuous sheet of lesser thickness than the continuous sheet exiting from the die. The final thickness may depend on the desired end-use application.

The product passes to a first extraction zone where the processing plasticizer is substantially removed by extraction with an organic liquid which is a good solvent for the processing plasticizer, a poor solvent for the organic polymer, and more volatile than the processing plasticizer. Usually, but not necessarily, both the processing plasticizer and the organic extraction liquid are substantially immiscible with water. The product then passes to a second extraction zone where the residual organic extraction liquid is substantially removed by steam and/or water. The product is then passed through a forced air dryer for substantial removal of residual water and remaining residual organic extraction liquid. From the dryer the microporous material may be passed to a take-up roll, when it is in the form of a sheet.

The processing plasticizer has little solvating effect on the thermoplastic organic polymer at 60° C., only a moderate solvating effect at elevated temperatures on the order of about 100° C., and a significant solvating effect at elevated temperatures on the order of about 200° C. It is a liquid at room temperature and usually it is processing oil such as paraffinic oil, naphthenic oil, or aromatic oil. Suitable processing oils include those meeting the requirements of ASTM D 2226-82, Types 103 and 104. Those oils which have a pour point of less than 22° C., or less than 10° C., according to ASTM D 97-66 (reapproved 1978) are used most often. Examples of suitable oils include Shellflex® 412 and Shellflex® 371 oil (Shell Oil Co.) which are solvent refined and hydrotreated oils derived from naphthenic crude. It is expected that other materials, including the phthalate ester plasticizers such as dibutyl phthalate, bis(2-ethylhexyl) phthalate, diisodecyl phthalate, dicyclohexyl phthalate, butyl benzyl phthalate, and ditridecyl phthalate will function satisfactorily as processing plasticizers.

There are many organic extraction liquids that can be used. Examples of suitable organic extraction liquids include 1,1,2-trichloroethylene, perchloroethylene, 1,2-dichloroethane. 1,1,1-trichloroethane, 1,1,2-trichloroethane, methylene chloride, chloroform, isopropyl alcohol, diethyl ether and acetone.

In the above described process for producing microporous material substrate, extrusion and calendering are facilitated when the filler carries much of the processing plasticizer. The capacity of the filler particles to absorb and hold the processing plasticizer is a function of the surface area of the filler. Therefore the filler typically has a high surface area. High surface area fillers are materials of very small particle size, materials having a high degree of porosity or materials exhibiting both characteristics. Usually the surface area of the filler itself is in the range of from about 20 to about 400 square meters per gram as determined by the Brunauer, Emmett, Teller (BET) method according to ASTM C 819-77 using nitrogen as the adsorbate but modified by outgassing the system and the sample for one hour at 130° C. Often the surface area is in the range of from about 25 to 350 square meters per gram. Inasmuch as it is desirable to essentially retain the filler in the microporous material substrate, the filler should be substantially insoluble in the processing plasticizer and substantially insoluble in the organic extraction liquid when microporous material substrate is produced by the above process.

The residual processing plasticizer content is usually less than 15 percent by weight of the resulting microporous material and this may be reduced even further to levels such as less than 5 percent by weight, by additional extractions using the same or a different organic extraction liquid.

The microporous materials of the present invention are printable using any of a wide variety of printing media and printing processes known in the art. The term "printable", as used herein means that the subject material can be printed using some printing media, for example, printing inks, and one or more printing methods. Non-limiting examples of such printing methods include, but are not limited to, typographic printing, e.g., rubber stamp printing, letterpress printing, flexography, and letterset printing (also known as dry offset printing and offset letterpress printing); intaglio printing, and gravure printing; planographic printing, e.g., lithography, hectograph printing and xerography; stencil printing, e.g., screen printing and mimeographic printing; typewriting and dot matrix printing; ink jet printing and electrophotographic printing. Suitable printing inks can include, for example, water-based inks and toners, oil-based inks and toners. The inks and toners may be in liquid form or in solid form.

The microporous materials of the present invention are suitable for a wide variety of end uses, especially those applications where a printable surface is required. For example, the microporous materials may be formed into sheets for durable documents such as maps, menus and cards.

Also, the microporous material is capable of maintaining its shape and supporting any subsequently applied layers. Thus, the microporous material is suitable for use as one or more layers in a multilayer article, for example, labels, such pressure sensitive labels, in-mold labels, RFID labels, RFID inlays and cards, identification cards, smart cards, loyalty cards, passports, drivers licenses, flexible packaging, and the like.

The microporous materials described above may be used individually or collectively in combination with each other to prepare multilayer articles, including biodegradable articles. Multilayer articles of the present invention comprise:

(a) at least one layer of any of the microporous materials described above and (b) at least one layer of a material that is the same as or different from the microporous material (a).

The material (b) may comprise a nonporous material such as poly vinyl chloride (PVC), polycarbonate, polyethylene terephthalate (PET) and rubber, and may be transparent, translucent, or opaque.

In certain embodiments, the material (b) comprises an adhesive. For example, a pressure sensitive label may be prepared wherein at least one outermost layer comprises an adhesive (which may be separate from a removable backing layer). Alternatively, an adhesive layer may be between one or more layers of microporous materials, one or more layers of other materials, or between a layer of microporous material and another material.

Data transmission devices, electronic circuitry, antennae, and/or magnetic materials may be incorporated into at least one layer of the multilayer articles of the present invention to prepare RFID labels, cards, and inlays, smart cards, data storage devices, electroluminescent displays, and the like.

Ultraviolet light absorbers and/or other additives may be incorporated into at least one layer of the multilayer articles of the present invention to prepare multilayer articles having outdoor exposure durability, suitable for use in or as articles such as outdoor signs, banners, etc.

The following examples are intended to illustrate various embodiments of the invention, and should not be construed as limiting the invention in any way.

EXAMPLES

In Part 1 of the following examples, the materials and methods used to prepare the Example mixes presented in Table 1 are described. In Part 2, the methods used to extrude, calender and extract the sheets prepared from the mixes of Part 1 are described. In Part 3, the methods used to determine the physical properties reported in Table 2 are described. In Part 4, a scale-up of the procedure described in Part 2 was used. The materials used in the Scale-up Control and Examples 8 and 9 are listed in Table 3 as percentages of the total mix.

Part 1—Mix Preparation

The dry ingredients were weighed into a FM-130D LITTLEFORD plough blade mixer with one high intensity chopper style mixing blade in the order and amounts (grams (g)) specified in Table I. The dry ingredients were premixed for 15 seconds using the plough blades only. The process oil was then pumped in via a hand pump through a spray nozzle at the top of the mixer, with only the plough blades running. The high intensity chopper blade was turned on, along with the plough blades, and the mix was mixed for 30 seconds. The mixer was shut off and the internal sides of the mixer were scrapped down to insure all ingredients were evenly mixed. The mixer was turned back on with both high intensity chopper and plough blades turned on, and the mix was mixed for an additional 30 seconds. The mixer was turned off and the mix dumped into a storage container.

TABLE 1

| Ingredients | Control | Ex. 1 | Ex. 2 |
| --- | --- | --- | --- |
| Silica (a) | 2270 | 2270 | 2270 |
| Antioxidant (b) | 7.7 | 7.7 | 0 |
| Lubricant (c) | 22.7 | 22.7 | 45.4 |
| TiO$_2$ (d) | 91 | 91 | 91 |
| UHMWPE (e) | 654 | 654 | 400 |
| HDPE (f) | 654 | 654 | 400 |
| Modified PE (g) | 0 | 0 | 25 |
| PLA (h) | 0 | 0 | 508 |
| EcoPURE (i) | 0 | 114.4 | 30 |
| Process oil (j) | 3851 | 3969 | 3368 |

(a) HI-SIL ® 135 precipitated silica was used and was obtained commercially from PPG Industries, Inc.
(b) CYANOX ® 1790 antioxidant, Cytec Industries, Inc.
(c) Calcium stearate lubricant, technical grade.
(d) TIPURE ® R-103 titanium dioxide, obtained commercially form E.I. du Pont de Nemours and Company
(e) GUR ® 4130 Ultra High Molecular Weight Polyethylene (UHMWPE), obtained commercially from Ticona Corp.
(f) FINA ® 1288 High Density Polyethylene (HDPE), obtained commercially from Total Petrochemical
(g) EPOLENE ® G-2608 polymer reported to be a maleic anhydride grafted polyethylene obtained commercially from Eastman.
(h) Ingeo ™ 2002D PLA from Natureworks LLC
(i) EcoPure ® from Bio-Tec Environmental LLC
(j) TUFFLO ® 6056 process oil, obtained commercially from PPC Lubricants.

Part 2—Extrusion, Calendering And Extraction

The mixes of the Examples and Control were extruded and calendered into final sheet form using an extrusion system including a feeding, extrusion and calendering system described as follows. A gravimetric loss in weight feed system (K-Tron model # K2MLT35D5) was used to feed each of the respective mixes into a 27 mm twin screw extruder (model # was LEISTRITZ Micro-27gg). The extruder barrel was comprised of eight temperature zones and a heated adaptor to the sheet die. The extrusion mixture feed port was located just prior to the first temperature zone. An atmospheric vent was located in the third temperature zone. A vacuum vent was located in the seventh temperature zone.

The mix was fed into the extruder at a rate of 90 g/minute. Additional processing oil also was injected at the first temperature zone, as required, to achieve the desired total oil content in the extruded sheet. The oil contained in the extruded sheet (extrudate) being discharged from the extruder is referenced herein as the "extrudate oil weight percent".

Extrudate from the barrel was discharged into a 15-centimeter wide sheet MASTERFLEX® die having a 1.5 millimeter discharge opening. The extrusion melt temperature was 203-210° C. and the throughput was 7.5 kilograms per hour.

The calendering process was accomplished using a three-roll vertical calender stack with one nip point and one cooling roll. Each of the rolls had a chrome surface. Roll dimensions were approximately 41 cm in length and 14 cm in diameter. The top roll temperature was maintained between 135° C. to 140° C. The middle roll temperature was maintained between 140° C. to 145° C. The bottom roll was a cooling roll wherein the temperature was maintained between 10-21° C. The extrudate was calendered into sheet form and passed over the bottom water cooled roll and wound up.

A sample of sheet cut to a width up to 25.4 cm and length of 305 cm was rolled up and placed in a canister and exposed to hot liquid 1,1,2-trichloroethylene for approximately 7-8 hours to extract oil from the sheet sample. Afterwards, the extracted sheet was air dried and subjected to test methods described hereinafter.

Part 3—Testing and Results

Physical properties measured on the extracted and dried films and the results obtained are listed in Table 2. Tensile strength at 1% strain and maximum elongation were tested in accordance with ASTM D 828-97 (re-approved 2002) modified by using a sample crosshead speed of 5.08 cm/minute until 0.508 cm of linear travel speed is completed, at which time the crosshead speed is accelerated to 50.8 cm/second, and, where the sample width is approximately 1.2 cm and the sample gage length is 5.08 cm. Property values indicated by MD (machine direction) were obtained on samples whose major axis was oriented along the length of the sheet. CD (cross machine direction) properties were obtained from samples whose major axis was oriented across the sheet. The aforementioned ASTM test method is incorporated herein by reference.

Handle-O-Meter Stiffness was measured on a Handle-O-Meter, instrument available from Thwing-Albert Instrument Company. Two 4×4 inch (10.16×10.16 cm) specimens were cut from samples of the sheets prepared as described in Part 2. The machine direction was noted for each sample sheet. The first specimen was inserted in the machine direction under the penetrator beam covering the gap in the specimen platform and aligned with the corresponding line on the specimen platform. The test mode was set to single and the beam size was 1000 g. The load reading was zeroed. The peak load, measured as grams (g), was noted as value 1 and the sample was turned 180 degrees and retested to determine value 2. This test procedure was repeated for a second specimen cut from the same sample. The resulting two values from specimen 1 and the two values from specimen 2 were added together and then divided by four to yield an arithmetic average Handle-O-Meter value for the sample.

Both extrudate oil weight percent and final product oil weight percent were measured using a SOXHLET extractor, except that the extrudate oil weight percent determination used a specimen of extrudate sheet with no prior extraction, whereas the final product oil weight percent determination used a specimen of already extracted sheet as detailed in Part 2—Extrusion, Calendering and Extraction. In both cases, a sample specimen approximately 2.25×5 inches (5.72 cm×12.7 cm) was weighed and recorded to four decimal places. Each specimen was then rolled into a cylinder and placed into a SOXHLET extraction apparatus and extracted for approximately 30 minutes using trichloroethylene (TCE) as the solvent. The specimens were then removed and dried. The extracted and dried specimens were then weighed. Both oil weight percentage values (extrudate and final product) were calculated as follows: Oil Wt. %=(initial wt.−extracted wt.)×100/initial wt.

Thickness was determined using an ONO SOKKI thickness gauge EG-225. Two 4.5×5 inch (11.43 cm×12.7 cm) specimens were cut from each sample and the thickness for each specimen was measured in nine places (at least ¾ of an inch (1.91 cm) from any edge). The arithmetic average of the readings was recorded in mils to 2 decimal places and converted to microns.

The density of the Examples was determined by dividing the average anhydrous weight of two specimens measuring 4.5×5 inches (11.43 cm×12.7 cm) that were cut from each sample by the average volume of those specimens. The average volume was determined by boiling the two specimens in deionized water for 10 minutes, removing and placing the two specimens in room temperature deionized water, weighing each specimen suspended in deionized water after it has equilibrated to room temperature and weighing each specimen again in air after the surface water was blotted off. The average volume of the specimens was calculated as follows:

Volume (avg.)=[(weight of lightly blotted specimens weighed in air−sum of immersed weights)× 1.002]/2

The anhydrous weight was determined by weighing each of the two specimens on an analytical balance and multiplying that weight by 0.98 since it was assumed that the specimens contained 2 percent moisture.

The biodegradation was quantified using the ASTM D 5511-02.

TABLE 2

| Property | Control | Ex. 1 | Ex. 2 |
|---|---|---|---|
| (μm) | 156.7 | 139 | 144.8 |
| Extrudate Oil wt. % | 59.1 | 58.6 | 60 |
| Wt. % | 3.3 | 4.3 | 6.9 |
| Density (g/cc) | 0.576 | 0.55 | 0.539 |

TABLE 2-continued

| Property | Control | Ex. 1 | Ex. 2 |
|---|---|---|---|
| MD Stress @ 1% strain (kPa) | 1165 | 1379 | 1531 |
| CD Stress @ 1% strain (kPa) | 1145 | 924 | 627 |
| MD Stress @ Max. strain (kPa) | 5633 | 9211 | 10866 |
| CD Stress @ Max. strain (kPa) | 3882 | 3778 | 2062 |

TABLE 3

| | Average Total Vol | | Methane ($CH_4$) | | | Carbon Dioxide ($CO_2$) | | Total Carbon (C) Theoretical | | Biodegradation | |
|---|---|---|---|---|---|---|---|---|---|---|---|
| | Wt (g) | (ml) | Vol % | Vol (ml) | $CH_4$ (g) | % | Vol (ml) | Wt (g) | Total Wt (g) | (g), $C_i$ | % | Adjusted % |
| Ex 1 | 20 | 10,915 | 52.7 | 5752 | 4.12 | 36.1 | 3937 | 7.75 | 5.2 | 6.86 | 12.8 | 14.7 |
| Ex 2 | 20 | 12,502 | 52.7 | 6584 | 4.71 | 37.5 | 4688 | 9.23 | 6.05 | 6.2 | 27.9 | 32 |
| Positive | 40 | 39,518 | 62.7 | 24775 | 17.73 | 30.3 | 11959 | 23.55 | 19.72 | 17.68 | 87.1 | 100 |
| Negative | 10 | 10,268 | 48.2 | 4952 | 3.54 | 31 | 3188 | 6.28 | 4.37 | 8.57 | 0.6 | 0.6 |
| Inoculum | 1000 | 10,160 | 51.7 | 5250 | 3.76 | 27.6 | 2801 | 5.52 | 4.32 | | | |

Whereas particular embodiments of this invention have been described above for purposes of illustration, it will be evident to those skilled in the art that numerous variations of the details of the present invention may be made without departing from the scope of the invention as defined in the appended claims.

What is claimed is:

1. A biodegradable microporous material comprising:
   (a) a polyolefin matrix,
   (b) finely divided, substantially water-insoluble particulate filler distributed throughout the polyolefin matrix, said filler constituting from 30 to 90 weight percent of the microporous material,
   (c) at least 35 percent by volume of a network of interconnecting pores communicating throughout the microporous material, and
   (d) an amount of biodegradation promoting material distributed throughout the polyolefin matrix that is sufficient to render the microporous material biodegradable, said biodegradation promoting material comprising a furanone compound, a glutatic acid, a hexadecanoic acid compound, an organoleptic swelling agent or mixtures thereof.

2. The biodegradable microporous material of claim 1 wherein the polyolefin matrix comprises ultrahigh molecular weight polyethylene and high density polyethylene.

3. The biodegradable microporous material of claim 1 wherein the filler comprises a siliceous filler, talc, carbon black, charcoal, graphite, titanium oxide, iron oxide, copper oxide, zinc oxide, antimony oxide, zirconia, magnesia, alumina, molybdenum disulfide, zinc sulfide, barium sulfate, strontium sulfate, calcium carbonate, magnesium carbonate, or mixtures thereof.

4. The biodegradable microporous material of claim 3 wherein the filler is present in an amount of 50 percent to about 85 percent by weight of the microporous material.

5. The biodegradable microporous material of claim 1 wherein the microporous material is compostable.

6. A biodegradable multilayer article comprising:
(a) at least one layer of a microporous material and
(b) at least one layer of a material that is the same as or different from the microporous material (a), wherein the microporous material comprises:
(i) a polyolefin matrix,
(ii) finely divided, substantially water-insoluble particulate filler distributed throughout the polyolefin matrix, said filler constituting from 30 to 90 weight percent of the microporous material,
(iii) at least 35 percent by volume of a network of interconnecting pores communicating throughout the microporous material, and
(iv) an amount of biodegradation promoting material distributed throughout the polyolefin matrix that is sufficient to render the microporous material biodegradable, said biodegradation promoting material comprising a furanone compound, a glutaric acid, a hexadecanoic acid compound, an organoleptic swelling agent or mixtures thereof.

7. The biodegradable multilayer article of claim 6 wherein the microporous material is in the form of a sheet.

8. The biodegradable multilayer article of claim 6 wherein the polyolefin matrix comprises a mixture of (a) ultrahigh molecular weight polyethylene having an intrinsic viscosity of from 18 to 39 deciliters/gram and (b) lower molecular weight polyethylene having an ASTM D 1238-86 Condition E melt index of less than 50 grams/10 minutes and an ASTM D 123886 Condition F melt index of at least 0.1 gram/10 minutes.

9. The biodegradable multilayer article of claim 6 wherein the filler comprises siliceous filler, talc, carbon black, charcoal, graphite, titanium oxide, iron oxide, copper oxide, zinc oxide, antimony oxide, zirconia, magnesia, alumina, molybdenum disulfide, zinc sulfide, barium sulfate, strontium sulfate, calcium carbonate, magnesium carbonate, or mixtures thereof.

10. The biodegradable multilayer article of claim 6 wherein the filler is present in an amount of from 50 to 85 percent by weight of the microporous material.

11. The biodegradable multilayer article of claim 6 wherein the article is compostable.

12. The biodegradable multilayer article of claim 6 wherein the at least one layer (b) is nonporous.

13. The biodegradable multilayer article of claim 6 wherein the at least one layer (b) comprises an adhesive.

14. The biodegradable multilayer article of claim 6 wherein at least one layer of the multilayer article contains printed electronic circuitry.

15. The biodegradable microporous material of claim 1 wherein the polyolefin matrix comprises a mixture of (a) ultrahigh molecular weight polyethylene having an intrinsic viscosity of from 18 to 39 deciliters/gram and (b) lower molecular weight polyethylene having an ASTM D 1238-86 Condition E melt index of less than 50 grams/10 minutes and an ASTM D 1238-86 Condition F melt index of at least 0.1 gram/10 minutes.

16. The biodegradable microporous material of claim 15 wherein the polyolefin matrix is at least 70 weight percent ultrahigh molecular weight polyethylene.

17. The biodegradable microporous material of claim 16 wherein the filler comprises siliceous filler.

18. The biodegradable microporous material of claim 17 wherein the biodegradable material comprises a furanone compound, a glutaric acid, a hexadecanoic acid compound or mixtures thereof.

19. A biodegradable microporous material comprising:
(a) a polyolefin matrix,
(b) from 50 to 85 weight percent of substantially water-insoluble finely divided, particulate filler distributed throughout the polyolefin matrix,
(c) at least 35 percent by volume of a network of interconnecting pores communicating throughout the microporous material, and
(d) an amount of biodegradation promoting material distributed throughout the polyolefin matrix that is sufficient to render the microporous material biodegradable, said biodegradation promoting material comprising a furanone compound, a glutaric acid, a hexadecanoic acid compound, an organoleptic swelling agent or mixtures thereof.

20. The biodegradable microporous material of claim 19 wherein the polyolefin matrix comprises a mixture of (a) ultrahigh molecular weight polyethylene having an intrinsic viscosity of from 18 to 39 deciliters/gram and (b) lower molecular weight polyethylene having an ASTM D 1238-86 Condition E melt index of less than 50 grams/10 minutes and an ASTM D 1238-86 Condition F melt index of at least 0.1 gram/10 minutes.

21. The biodegradable microporous material of claim 20 wherein the polyolefin matrix is at least 70 weight percent ultrahigh molecular weight polyethylene.

22. The biodegradable microporous material of claim 20 wherein the filler comprises siliceous filler.

23. A biodegradable microporous material comprising:
(a) a polyolefin matrix comprising a mixture of (i) ultrahigh molecular weight polyethylene having an intrinsic viscosity of from 18 to 32 deciliters/gram and (ii) lower molecular weight polyethylene having an ASTM D 1238-86 Condition E melt index of less than 50 grams/10 minutes and an ASTM D 1238-86 Condition F melt index of at least 0.1 gram/10 minutes,
(b) from 50 to 85 weight percent, based on the microporous material, of finely divided, particulate substantially water-insoluble filler distributed throughout the polyolefin matrix,
(c) at least 35 percent by volume of a network of interconnecting pores communicating throughout the microporous material, and
(d) an amount of a biodegradation promoting material distributed throughout the polyolefin matrix that is sufficient to render the microporous material biodegradable, said biodegradation promoting material comprising a furanone compound, a glutaric acid, a hexadecanoic acid compound, an organoleptic swelling agent or mixtures thereof.

24. The biodegradable microporous material of claim 23 wherein the filler comprises siliceous filler.

25. A biodegradable microporous material comprising:
(a) a polyolefin matrix comprising a mixture of (i) ultrahigh molecular weight polyethylene having an intrinsic viscosity of from 18 to 39 deciliters/gram and (ii) lower molecular weight polyethylene having an ASTM D 1238-86 Condition E melt index of less than 25 grams/10 minutes and an ASTM D 1238-86 Condition F melt index of at least 0.5 gram/10 minutes,
(b) from 50 to 85 weight percent, based on the microporous material, of finely divided, particulate substantially water-insoluble filler distributed throughout the polyolefin matrix,
(c) at least 35 percent by volume of a network of interconnecting pores communicating throughout the microporous material, and (d) biodegradation promoting material distributed throughout the polyolefin matrix, said biodegradation promoting material comprising a furanone compound, a glutaric acid, a hexadecanoic acid compound, an organoleptic swelling agent, or mixtures thereof.

26. The biodegradable microporous material of claim 25 wherein the filler comprises siliceous filler.

* * * * *